UNITED STATES PATENT OFFICE.

JOHN C. DOANE, OF LOS ANGELES, CALIFORNIA.

METHOD OF PRESERVING CORN AND LIKE CEREALS.

1,044,150.  Specification of Letters Patent. Patented Nov. 12, 1912.

No Drawing.   Application filed April 30, 1912.  Serial No. 694,170.

*To all whom it may concern:*

Be it known that I, JOHN C. DOANE, a citizen of the United States, residing at Los Angeles, in the county of Los Angeles and State of California, have invented a new and useful Method of Preserving Corn and Like Cereals, of which the following is a specification.

This invention relates to a method for preserving corn, and a primal object thereof is to provide a preserving method that will eliminate from the corn all the objectionable constituents thereof that interfere with a perfect digestion of the same when consumed by persons. I accomplish this object by means of the method described herein, no drawing being necessary to illustrate the same.

Heretofore in preserving corn it has been the custom to cut or otherwise extract the kernels from the cobs, and after partially cooking the same they have been placed in cans or jars and hermetically sealed. While this method absolutely preserves the corn, it still retains certain objectionable constituents that render it indigestible when consumed.

The main objectionable constituent above referred to is the tough skins or hulls of the kernels which are naturally retained by the old method when preserved. This tough skin has been found extremely objectionable when consumed by many persons, as the intestinal juices of the body fail to properly act thereon, utilizing only the nitrogenous matter together with the fats contained in the kernels, and leaving as a refuse an indigestible mass of the tough and indigestible skins. By my improved process all the valuable constituents of the corn kernels are extracted from their skins or hulls preparatory to the preservation of the same.

In preparing corn for preservation by my process, I first take the ears of corn and slit or otherwise open the ends of the kernels, this being accomplished preferably by drawing knives along the exposed ends of the kernels in a direction longitudinal of the cob. After having slitted the ends of the kernels I press or extract in any suitable manner, but preferably by means of rollers, the digestible edible matter contained within the hulls, the empty hulls remaining on the cobs. During the extraction of the matter contained within the hulls the corn juices (commonly called the milk) are caught in a suitable receptacle and mixed with the solid matter obtained by the extraction. This matter is then partially cooked and placed in glass or similar containers, the corn then being in a condition for commercial purposes.

It will be noted from the foregoing that I have provided a process from which the principal objectionable constituent of canned corn is eliminated, thereby rendering the residue easily digestible, and permitting persons to partake of the same who have heretofore been unable to do so on account of the indigestible qualities of the corn canned in the usual manner.

What I claim is:

1. A process for the preservation of cereals which consists of first slitting the inclosing hulls of the grain, then extracting the matter contained in the hull of said grain, and finally sterilizing and hermetically sealing the same in containers.

2. The herein described process of preserving corn which consists of first slitting the outer skin of the corn kernels, then extracting the matter contained in said kernels therefrom, and finally sterilizing and hermetically sealing the same.

3. The herein described process of preserving corn, which consists of first slitting the outer skin of the corn kernel, then squeezing out the matter contained in said kernels, then heating the extracted mass until it is partially cooked, and finally hermetically sealing the same in cans.

In witness that I claim the foregoing I have hereunto subscribed my name this 19th day of April, 1912.

JOHN C. DOANE.

Witnesses:
EDMUND A. STRAUSE,
EARLE R. POLLARD.